US007744993B2

(12) United States Patent
Wu et al.

(10) Patent No.: US 7,744,993 B2
(45) Date of Patent: Jun. 29, 2010

(54) POLYMER FOAMS WITH TREATED FILLERS, FABRICATION METHOD AND PRODUCTS USING SAME

(75) Inventors: Wen Pao Wu, Pittsford, NY (US); David V. Dobreski, Canandaigua, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 11/687,475

(22) Filed: Mar. 16, 2007

(65) Prior Publication Data

US 2007/0269647 A1 Nov. 22, 2007

Related U.S. Application Data

(63) Continuation of application No. PCT/US2005/033002, filed on Sep. 16, 2004.

(60) Provisional application No. 60/611,262, filed on Sep. 17, 2004.

(51) Int. Cl.
*B32B 27/20* (2006.01)

(52) U.S. Cl. .............. 428/319.3; 428/319.7; 428/319.9; 428/317.9; 428/316.6; 428/318.6

(58) Field of Classification Search .............. 428/316.6, 428/319.3, 319.7, 317.9
See application file for complete search history.

(56) References Cited

U.S. PATENT DOCUMENTS 5,876,812 A 3/1999 Frisk et al.
6,117,541 A 9/2000 Frisk
6,232,354 B1 * 5/2001 Tan .............................. 521/60
6,403,231 B1 6/2002 Mueller et al.
6,414,070 B1 7/2002 Kausch et al.
6,586,483 B2 * 7/2003 Kolb et al. ..................... 521/91
6,759,446 B2 * 7/2004 Lee et al. ....................... 521/83
6,790,896 B2 9/2004 Chaiko
6,958,860 B2 * 10/2005 Dontula et al. .............. 359/599
2001/0033924 A1 10/2001 Qian et al.
2002/0156171 A1 * 10/2002 Drewniak et al. ........... 524/445
2002/0190440 A1 * 12/2002 Wilson ........................ 264/553
2002/0198272 A1 * 12/2002 Hayashi et al. ............... 521/82
2003/0033924 A1 2/2003 Glover
2003/0176537 A1 9/2003 Chaiko
2003/0205832 A1 11/2003 Lee et al.
2005/0112356 A1 * 5/2005 Rynd et al. .............. 428/317.9
2007/0196644 A1 * 8/2007 Wu et al. .................... 428/323
2007/0197710 A1 * 8/2007 Wu et al. .................... 524/445

FOREIGN PATENT DOCUMENTS

WO WO97/31053 8/1997
WO WO03/082966 10/2003
WO WO2004/063259 7/2004

OTHER PUBLICATIONS

Alexandre et al., "Polymer-layered silicate nanocomposites: preparation, properties and uses of a new class of materials," Materials Science and Engineering Reports, vol. 28, No. 1-2, pp. 1-63, Jun. 2000.
Cloisite Product Literature, downloaded from http://www.nanoclay.com/ on Jan. 30, 2009.
Vasile et al., Handbook of Polyolefins, 1993, Marcel Dekker, Inc., pp. 791-793.
Zhang et al., "Pet-clay hybrids with improved tensile strength," Mar. 2003, Materials Letters, North Holland Publishing Company, Amsterdam, NL, pp. 1858-1862.
U.S. Appl. No. 12/066,593, filed Mar. 12, 2008, Dobreski et al.
Nanocor PGW product literature, accessed from the Internet from http://www.nanocor.com/tech_sheets/G105.pdf on Mar. 16, 2009.

* cited by examiner

*Primary Examiner*—Hai Vo
(74) *Attorney, Agent, or Firm*—Baker Botts LLP

(57) ABSTRACT

The present invention provides for a polymer composite foam with a treated filler and methods for making the same. The polymer composite foam includes a polymer capable of being formed into a polymeric foam and a treated filler, wherein the polymer defines a plurality of cells dispersed therethrough and the treated filler is dispersed throughout the polymer. The filler is treated by techniques which exfoliate, delaminate or intercalate the filler particles into individual micro and/or nano size particulates and platelets. Ideally, the treated filler has a median particle size ranging from about 0.1 nm-10 μm. The treated filler enhances the rigidity, barrier properties, heat deflection temperature, nucleation characteristics, fire retardant characteristics and impact properties of the foam. The products fabricated from the polymer composite foam include containers, cups, sleeves, bags, plates, bowls, protective packaging, boards, sheets, void fillers, storageware, dinnerware and cookware. The present invention also provides for methods of fabricating the polymer composite foam.

25 Claims, No Drawings

POLYMER FOAMS WITH TREATED FILLERS, FABRICATION METHOD AND PRODUCTS USING SAME

CROSS-REFERENCE TO RELATED APPLICATIONS

This application is a continuation of International Application PCT/US05/033002, filed Sep. 16, 2005, which claims priority to U.S. Provisional Application Ser. No. 60/611,262, filed Sep. 17, 2004, each of which is incorporated by reference in its entirety herein.

BACKGROUND OF THE INVENTION

1. Field of the Invention

The present invention relates to a polymer material with treated fillers and articles and methods of using same. Particularly, the present invention is directed to the use of treated filler materials in the manufacture of polymer composite foams, to be formed or molded into packaging or consumer products having enhanced properties.

2. Description of Related Art

Packaging structures such as boxes, containers, trays, cups, dinnerware and the like, are formed from a variety of thermoplastic and thermosetting polymers. Mineral fillers are used extensively to enhance the performance of a wide range of such polymers. It is well known that the improvement in the properties of polymers can occur with the proper use of well-dispersed fillers possessing high aspect ratios and small particle sizes. Physical properties of the polymer that can be improved by the use of such fillers include stiffness, strength, temperature resistance, dimensional stability, surface hardness and scratch resistance. Other properties that can be improved with the use of well-dispersed fillers possessing high aspect ratios and small particle sizes include clarity, chemical resistance, flame retardancy, rheological properties, and crystallinity. Such fillers can also be used to reduce permeability to gases and liquids, thereby improving the barrier property of the polymer.

The most commonly used fillers in plastics are calcium carbonate, wollastonite, silica and the phyllosilicates such as kaolin, talc and mica. Many fillers, such as calcium carbonate, silica and phyllosilicates, however, are hydrophilic and therefore must be surface treated in order to improve their dispersion and interaction with the polymer matrix.

Conventional surface treatment of fillers includes reacting the filler surfaces with organosilanes, modified oligomers and polymers containing anhydride functional groups and a wide variety of surfactants. More recently, it has been determined that the exfoliation and nanoscale dispersion of small amounts of treated fillers into polymers results in composite materials with enhanced physical features and significant reductions in weight as compared to polymers with conventional or non-treated fillers. Nanocomposites are a new class of composites that are particle-filled polymers for which at least one dimension of the dispersed filler is in the nanometer range ($10^{-9}$ meter).

Various methods are known in the art for creating composites with modified fillers which are exfoliated and dispersed in a polymer matrix. Under current methods known in the art, large quantities of volatile polar surfactants are required to ensure complete exfoliation, intercalation or delamination of fillers. There thus remains a need for enhancing the properties of polymer composite foams through the use of treated fillers, particularly, fillers that do not require large quantities of surfactants.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof.

To achieve these and other advantages and in accordance with the purpose of the invention, as embodied and broadly described, the invention is directed to the use of treated fillers in the manufacture of a polymer composite foam through conventional processing techniques. Such techniques include, but are not limited to, expandable bead foam techniques and melt-processing techniques such as, extrusion, compression molding, blow molding, injection molding and the like. The composite foam is then formed or molded into packaging or consumer products having enhanced physical properties. The products include, but are not limited to, trays, containers, cups, sleeves, bags, plates, bowls, protective packaging, sheets, boards, void fillers, storageware, dinnerware and cookware.

In accordance with the invention, the polymer composite foam includes a polymer capable of being formed into a polymer foam, a plurality of cells dispersed throughout the polymer and a treated filler having a median particle size of about 0.1 nm-10 μm, wherein the treated filler is dispersed throughout the polymer forming the polymer composite foam.

In further accordance with the invention, the filler is treated by a process which delaminates, intercalates or exfoliates the filler. In accordance with a preferred embodiment of the invention, the filler is treated by an edge-modifying process, which preferably includes a surfactant absorbed along the edges of the filler. Generally the fillers include, but are not limited to, calcium carbonate, wollastonite, silica and phyllosilicates.

In accordance with the invention, the treated filler enhances at least one physical property of the polymer foam including, rigidity, barrier property, heat deflection temperature, nucleation, fire retardancy and impact property of the foam.

In a further embodiment, the invention is directed to a multi-layer polymer composite foam. Preferably, the multi-layered composite foam has at least one layer including a polymer and a treated filler.

In yet a further embodiment, the invention includes a polymer composite foam including a polymer capable of being formed into a polymeric foam, a plurality of cells dispersed throughout the polymer, a treated filler having a median particle size of about 0.1 nm-10 μm, and a non-treated filler, wherein both the treated and non-treated fillers are dispersed throughout the polymer matrix.

In yet a further embodiment, the invention includes a method for fabricating a polymer composite foam by treating a filler through a process which delaminates, exfoliates or intercalates the filler, dispersing the treated filler to a polymer matrix, adding a suitable blowing agent to the polymer matrix and forming the polymer matrix into a polymer composite foam.

It is to be understood that both the foregoing general description and the following detailed description are exemplary and are intended to provide further explanation of the invention claimed.

DETAILED DESCRIPTION OF THE PREFERRED EMBODIMENT

The present invention provides for a polymer composite foam with a treated filler for forming packaging and/or consumer products, and methods for making the same. The polymer composite foam is manufactured using conventional processing techniques such as, for example, expandable bead foam techniques and melt-processing techniques such as, for example, extrusion, compression molding, blow molding, injection molding and the like. Conventional processing techniques for manufacturing polymer foams are disclosed in U.S. Pat. Nos. 6,136,875 and 6,696,504 and U.S. Patent Publication Nos. 2004/0132844 and 2004/0006149, the disclosures of which are incorporated by reference herein.

As embodied herein, and in accordance with one aspect of the invention, the invention provides for a polymer composite foam including a polymer capable of being formed into a polymer foam, a plurality of cells dispersed throughout the polymer and a treated filler, wherein the treated filler is dispersed throughout the polymer forming the foam. Improvement in the properties of polymers is facilitated by the use of well-dispersed fillers possessing high aspect ratios and small particle sizes. The aspect ratio is defined as the ratio of a particle's major axis (e.g., length) to a minor axis (e.g., thickness), or alternatively, a particle's length to its diameter. In accordance with a preferred embodiment of the invention the aspect ratios of the fillers range from 5 to 500 and more preferably between 5 and 100.

Without being bound by a particular theory, it is desirable to enhance the delamination, intercalation or exfoliation of the filler particles into individual platelets or smaller particulates in order to maximize the properties of the resultant polymer composite foam and ultimately the products manufactured therefrom. In accordance with a preferred embodiment of the invention, the fillers are delaminated such that the average platelet or median particle size ranges from about 0.1 nm to 10 μm.

There are many methods to produce treated fillers of nano and micro size particles for use in specific polymeric foams. Generally, the methods can be grouped into three generic categories: (1) in situ polymerization; (2) solution intercalation; and (3) melt exfoliation. Such techniques are disclosed in U.S. Pat. No. 5,876,812, which is incorporated in its entirety by reference herein. Depending on the type of filler used, once treated, the fillers are segregated or separated into platelets or particulates. Any suitable process or technique which successfully reduces the particles of a filler into individual micro and/or nano size platelets or particulates may be used in the present invention. In accordance with a preferred embodiment of the invention, the fillers are treated by techniques which exfoliate, delaminate or intercalate the fillers as described further below. However, it shall be understood that any technique, conventional or non-conventional, which can reduce the particles of a filler into micro and/or nano size particulates or platelets may be used without departing from the spirit or scope of the invention.

Generally, it is desirable to treat the fillers, e.g. the clays or talcs, to facilitate separation of the agglomerates of platelet particles to individual particles and small tactoids. Typically, the fillers are treated by surfactants or swelling agents to modify the surface of the fillers and allow exfoliation, delamination and intercalation of the fillers into the polymer matrix. The polymer chains thus can be intercalated between the layers of the filler or the filler layers may be delaminated and dispersed in a continuous polymer matrix.

Intercalation generally is defined as the insertion of mobile guest species (atoms, molecules or ions) into a crystalline host lattice that contains an interconnected system of empty lattice sites of appropriate size. The intercalation process results in the development of intercalates which are more organophilic and which can be more readily exfoliated (dispersed) when mixed with a polymer to form an ionomeric nanocomposite. These intercalates are typically on the order of 1 nanometer thick, but about 100 to 1,000 nanometers across. This high aspect ratio, and the resulting high surface area, provides high reinforcement efficiency at low loading levels. Intercalation also can be accomplished by dispersing the nanostructured materials in a solution containing an oxidizing agent, e.g., a mixture of nitric acid and sulfuic acid.

In accordance with one embodiment of the invention, the treated filler is integrated into the polymer material matrix by intercalating the surfactant-mineral filler complex with the polymer material matrix to form an intercalated polymer material. In this specific example, the intercalated polymer material has a defined x-ray diffraction profile for an interlayer or gallery spacing. In an alternative embodiment, the integration of the treated filler into the polymer material matrix is accomplished by exfoliating the filler mineral into the polymer material matrix to form a polymer exfoliated filler material.

Several techniques are disclosed for the exfoliation, intercalation or delamination of filler particles. For example, U.S. Pat. No. 6,057,035, which is incorporated in its entirety by reference herein, discloses nanocomposites systems that are exfoliated with tetraphenyl phosphonium to achieve greater temperature stability.

U.S. Pat. No. 5,910,523, which is incorporated in its entirety by reference herein, discloses a composition comprising a semi-crystalline polyolefin, a clay filler having dispersible platelets in stacks, an amino-functional silane reacted with the filler, and a carboxylated or maleated semi-crystalline polyolefin that has been reacted with the amino-functional silane after the silane was reacted with the filler.

U.S. Pat. No. 6,228,903, which is incorporated in its entirety by reference herein, discloses a composition made by contacting a phyllosilicate material that is exfoliated in an organic solvent with a polymer/carrier composition that includes a water-insoluble polymer and a solvent, whereupon the adherent solvent is driven off.

U.S. Pat. No. 6,451,897, which is incorporated in its entirety by reference herein, discloses a composite material made in a substantially non-oxidizing environment by graft polymerizing a liquid monomer onto a propylene resin in the presence of smectite clay and a free radical initiator. The propylene resin is a porous material, wherein more than 40% of the pores have a diameter greater than 1 micron. The liquid monomer may be a vinyl-substituted aromatic, a vinyl ester, or an unsaturated aliphatic nitrite or carboxylic acid.

U.S. Pat. No. 6,462,122, which is incorporated in its entirety by reference herein, discloses a nanocomposite blend containing a layered silicate material, a matrix polyolefin, and a functionalized polyolefin (e.g., maleic-anhydride-modified polypropylene) that may be blended together in, for example, a twin-screw extruder.

U.S. Pat. No. 4,810,734, which is incorporated in its entirety by reference herein, discloses a process for producing a composite material by contacting a layered clay mineral with a swelling agent in the presence of a dispersion medium such as water, an alkanol, or dimethyl sulfoxide, mixing with a polymerizable monomer or a mixture of monomer and dispersion medium, and polymerizing the monomer in the mixture. Catalysts and accelerators for polymerization can also be present. The polymer that is formed can be, for example, a polyamide, a vinyl polymer, or a thermoset resin.

U.S. Pat. No. 5,514,734, which is incorporated in its entirety by reference herein, discloses a composite material comprising a polymer matrix having layered or fibrillar particles, e.g., phyllosilicates, uniformly dispersed therein, the particles being bonded to organosilanes, organo titanates, or organo zirconates and having one or more moieties bonded to at least one polymer in the polymer matrix.

U.S. Pat. No. 5,760,121, which is incorporated in its entirety by reference herein, discloses a composite material comprising a host material such as a polyamide, polyvinylamine, polyethylene terephthalate, polyolefin, or polyacrylate, and exfoliated platelets of a phyllosilicate material. The platelets are derived from an intercalate formed without an onium ion or silane coupling agent by contacting with an intercalant polymer-containing composition containing water and/or an organic solvent.

U.S. Pat. No. 5,910,523, which is incorporated in its entirety by reference herein, discloses a composition comprising (a) a semi-crystalline polyolefin, (b) a clay filler having dispersible platelets in stacks, (c) an amino-functional silane reacted with the filler, and (d) a carboxylated or maleated semi-crystalline polyolefin that has been reacted with the aminofunctional silane after the silane was reacted with the filler.

In accordance with another aspect of the invention, surface treatment of the fillers, in particular those which are hydrophilic, includes reaction of the filler surface with organosilanes, modified oligomers and a wide variety of surfactants. The hydrophilic fillers generally must be surface treated to render them compatible with plasticizing polymers. The surfactant is a swelling agent which assists in the integration of the filler with the polymer material. Typically, the entire surface of the filler is treated with surfactant. However, in a preferred embodiment of the invention, the edges of the fillers are modified using various surfactants, such as, for example organophosphorus and organosulfur compounds. The fillers, such as phyllosilicates, are edge modified with various organic surfactants that preferentially are absorbed along the edges of the fillers. Edge-treatment improves the properties of the resulting polymer composite foam because less surfactant can be used in the process. U.S. Patent Application 2003/0176537 (now issued as U.S. Pat. No. 6,790,896), which is incorporated in its entirety be reference herein, discloses an edge-treatment of phyllosilicates that uses a fraction of the amount of surfactant used by conventional exfoliation processes. The process can be applied to either an ion exchangeable phyllosilicate, such as a smectite clay or mica, or a non-ion exchangeable phyllosilicate.

Organic molecules suitable as surfactants or swelling agents include cationic surfactants such as ammonium, phosphonium or sulfonium salts; amphoteric surface active agents; derivatives of aliphatic, aromatic or arylaliphatic amines, phosphines and sulfides; and organosilane compounds. Other suitable swelling agents include protonated amino acids and salts thereof containing 2-30 carbon atoms such as 12-aminododecanoic acid, epsilon-caprolactam and like materials. A preferred swelling agent includes ammonium to effect partial or complete cation exchange.

The fillers used in the present invention include, but are not limited to, calcium carbonate, wollastonite, silica and the phyllosilicates such as kaolin, talc and mica. Suitable phyllosilicates for use in the invention are clays, including mica, kaolinite, and smectite, vermiculite, and halloysite clays, and naturally occurring hydrophobic minerals, such as talc. Natural or synthetic phyllosilicates, for example, are sheet structures basically composed of silica tetrahedral layers and alumina octahedral layers. Suitable smectite clays include montmorillonite, hectorite, saponite, sauconite, beidellite, nontronite and synthetic smectites such as Laponite™. Suitable phyllosilicates are available from various companies including Nanocor, Inc., Southern Clay Products, Kunimine Industries, Ltd., Rheox and Argonne National Labs. The phyllosilicates discussed herein have basal surfaces and are arranged in layers of particles stacked on top of one another. The stacking of the clay particles provides interlayers, or galleries, between the phyllosilicate layers. These galleries are normally occupied by cations, typically including sodium, potassium, calcium, magnesium ions and combinations thereof, that balance the charge deficiency generated by the isomorphous substitution within the clay layers. Typically, water is also present in the galleries and tends to associate with the cations.

The most preferred fillers in the polymer composite foam of the present invention are those based on clays and talc. It is known that these layered phyllosilicates can be treated with organic molecules such as, e.g., organic ammonium ions to insert the organic molecules between adjacent planar silicate layers thereby increasing the interlayer spacing between the adjacent silicate layers. This process is known as intercalation and the resulting treated filler is generally referred to as a treated phyllosilicate. The thus-treated intercalated phyllosilicates have interlayer spacing of at least about 10-20 Angstroms and up to about 100 Angstroms. In order to achieve good intercalation, exfoliation and dispersion of the clay minerals, processing conditions should be such that both shear rate and residence time are optimized. Generally, the layered clay material useful in this invention are an agglomeration of individual platelet particles that are closely stacked together like cards, in domains called tactoids. The individual platelet particles of the clays preferably have thickness of about 10 to about 3000 nm. The composites are typically obtained by the intercalation or penetration of the polymer (or a monomer subsequently polymerized) inside galleries of layered phyllosilicates and the subsequent exfoliation, or dispersion, of the intercalate throughout the polymer matrix.

Depending on the type of filler used and the degree of intercalation, exfoliation or delamination obtained, and the particle sizes, the treated filler can be present in any amount suitable to impart enhanced properties to the polymer composite foam and products manufactured therefrom. In a preferred embodiment of the invention, the treated filler is present from about 0.1 to 30 weight percent in the polymer product, more preferably from about 3 to 20 weight percent. However, in accordance with yet another embodiment, the treated filler is present in very small amounts, such as, for example from about 300-1000 parts per million. It shall be understood that any suitable amount of treated filler capable of accomplishing a desired result may be used without departing from the spirit or scope of the invention.

In accordance with an exemplary embodiment of the invention, the preferred fillers are phyllosilicates such as talcs or clays which have been treated via edge-modifying techniques. In a preferred embodiment, the phyllosilicates are edge-modified using various organophosphorus and/or organosulfur compounds.

In accordance with a preferred embodiment of the invention, in order to obtain a polymer composite foam with enhanced properties, the treated fillers should be exfoliated, intercalated or delaminated so as to be dispersed in the form of individual platelets or aggregates having sizes of about 0.1 nm-10 μm.

The polymeric component of the composite includes, but is not limited to, functionalized or non-functionalized propylene polymers, functionalized or non-functionalized ethylene polymers, functionalized or non-functionalized styrenic block copolymers, styrene butadiene copolymers, ethylene ionomers, styrenic block ionomers, polyurethanes, polyesters, polycarbonate, polystyrene, and mixtures or copolymers thereof.

Additional polymers suitable for use in the composite foams of the present invention are exemplified, but not limited to, polyolefins such as low density polyethylene (LDPE), linear low density polyethylene (LLDPE), medium density polyethylene (MDPE), high density polyethylene (HDPE), and polypropylene (PP), polyamides such as poly(m-xyleneadipamide) (MXD6), poly(hexamethylenesebacamide), poly (hexamethyleneadipamide) and poly(epsilon-caprolactam), polyacrylonitriles, polyesters such as poly(ethylene terephthalate), polylactic acid (PLA), polycaprolactone (PCL) and other aliphatic or aromatic compostable or degradable polyesters, alkenyl aromatic polymers such as polystyrene, and mixtures or copolymers thereof. Other polymers suitable for use in the composite foams of the invention include ethylene vinyl alcohol copolymers, ethylene vinyl acetate copolymers, polyesters grafted with maleic anhydride, polyvinylidene chloride (PVdC), aliphatic polyketone, LCP (liquid crystalline polymers), ethylene methyl acrylate copolymer, ethylene-norbornene copolymers, polymethylpentene, ethylene acyrilic acid copoloymer, and mixtures or copolymers thereof. Further polymers that may be used include epoxy and polyurethane adhesives.

Although not required, the oligomers and/or polymers of the present invention may also include suitable additives normally used in polymers. Such additives may be employed in conventional amounts and may be added directly to the reaction forming the functionalized polymer or oligomer or to the matrix polymer. Illustrative of such additives known in the art include, but are not limited to, colorants, pigments, carbon black, glass fibers, fillers, impact modifiers, antioxidants, stabilizers, flame retardants, reheat aids, crystallization aids, acetaldehyde reducing compounds, recycling release aids, oxygen scavengers, plasticizers, nucleators, mold release agents, compatibilizers, and the like, or their combinations.

In accordance with one aspect of the invention, the polymer composite foam preferably has at least one layer including a polymer and a treated filler dispersed throughout the at least one layer to define the composite foam. In a further embodiment, the at least one layer further includes a non-treated filler dispersed throughout the at least one layer. In further accordance with the invention, the polymer composite foam can have a multi-layered construction. The multi-layered polymer composite foam can include at least one additional layer of polymer material, wherein the at least one additional layer includes a treated filler.

In accordance with yet another aspect of the invention, the at least one additional layer includes a non-treated filler. Further in accordance with the invention, the multi-layered polymer composite foam includes at least one layer including a polymer and a treated filler and at least one layer including a polymer and a non-treated filler. For purposes of illustration and not limitation, the polymer foam can include a treated filler disposed adjacent to a second layer of the same or different properties or in a preferred embodiment disposed intermediate to two or more layers. Thus, the multi-layer polymer foam may also contain one or more layers of the treated filler composite of this invention and one or more layers of a structural polymer. A wide variety of structural polymers may be used. Illustrative of structural polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrene, polyethylene-co-vinyl alcohols (EVOH), and the like or their combinations and blends. In one embodiment, the preferred structural polymers are polyolefins such as polypropylenes and polyethylenes. In another embodiment, the preferred structural polymers are polyesters, such as poly(ethylene terephthalate) and its copolymers. In yet another embodiment, the preferred structural polymers are alkenyl aromatic polymers, such as polystyrene and high impact polystyrene.

The multi-layer polymer composite foam can be formed by a variety of processing techniques including, but not limited to, lamination, co-extrusion and co-injection molding. The multi-layer composite foam can be composed entirely of foam materials or multiple structural materials including, but not limited to, sheets, foams, films, paper and the like. In accordance with a preferred embodiment of the invention, the multi-layer polymer composite foam is formed into products as described herein. Numerous advantages are provided in a multi-layer structure. For example, a multilayer structure with outer (skin) layers having higher rigidity than that of the core layer material can impart an I-beam effect to the entire composite structure, resulting in a higher effective rigidity. A multi-layer structure also allows one to put the lower cost or performance material in the core layer to reduce cost.

In accordance with yet another aspect of the invention, the polymer composite foam includes a blend of treated fillers, which have been exfoliated, intercalated or delaminated, and non-treated fillers. For example, and not limitation, the polymer composite foam may include 0.03-15 weight percent of treated fillers and 5-60 weight percent of non-treated fillers. However, it shall be understood that any suitable ratio of treated filler to non-treated filler capable of accomplishing a desired result can be used without departing from the spirit or scope of the invention. In accordance with a preferred embodiment of the invention, the polymer composite foam blend is formed into products as described herein.

In accordance with yet another aspect of the invention, the invention is directed to a polymer composite foam including a blend of at least two polymers wherein at least one polymer contains a treated filler. The treated filler is typically dispersed throughout the polymer and enhances the properties of the entire polymer foam blend. Typically, the polymers are compatible, however, the blend may also include incompatible polymers. Incompatible polymers typically include combinations of polymers that are relatively immiscible, that is, form a cloudy solution and/or cloudy dry film or complete phase separation when mixed. Incompatible polymers also include those that have partial compatibility with each other. However, the addition of a polymeric dispersant can act to aid in the compatibility of the mixture, providing a stable polymer blend. To further enhance the property of the polymer foam blend, the treated filler can be added to one of the incompatible polymers prior to creating the stable incompatible polymer blend and the properties of the incompatible blend, such as stiffness and strength can be enhanced.

Further in accordance with the invention, a method is provided for fabricating a polymer foam, the method including the steps of treating a filler through processes which exfoliate, delaminate or intercalate the filler, dispersing the treated filler into a polymer matrix, adding a blowing agent to the polymer matrix and forming the polymer matrix into a polymer composite foam. In accordance with a preferred embodiment of the invention, the filler is treated by an edge-treatment process.

Blowing agents can be included in the mixture to produce foamed articles. The expanding medium, or blowing agent, can include a physical blowing agent or a chemical blowing agent. A physical blowing agent is a medium expanding composition that is a gas at temperatures and pressures encountered during the foam expanding step. Typically, a physical blowing agent would be introduced to the melted polymer blend in the gaseous or liquid state, dissolved into the polymer blend, and expanded, for example, upon a rapid decrease in pressure. A chemical blowing agent is a compound or mixture of compounds that decompose at elevated temperatures to form one or more gases, which can be used to expand the polymer blend into a foam. The processing of a polymer and a blowing agent causes formation of cells throughout the polymer foam.

Cell nucleation and growth are two important factors controlling cell morphology. Fillers can serve as nucleation agents to improve heterogeneous nucleation. Inorganic nucleation agents include, but are not limited to, talc, titanium dioxide, calcium carbonate, and other inorganic salts. A fine dispersion of these nucleation agents can promote formation of nucleation centers for the gaseous phase. The size, shape, and distribution, and surface treatment of particles have great influences on the nucleation efficiency. The treated filler foam preparations of the present invention have a controlled cell structure. In addition, the treated filler may further improve the foam properties, e.g., mechanical and barrier properties, as well as fire resistance. The treated filler decreases the cell size and increases the cell density of the polymeric foam.

Cell size can vary widely depending upon operating conditions, however, it is preferred that the polymer composite foam has an average cell size ranging from about 1 to 500 microns. As such, polymer foam has a density substantially lower than that of a sheet or film or other polymer member with no cells. Generally, polymer foam has a density of less than about 20 $lb/ft^3$, and preferably less than about 10 $lb/ft^3$.

In accordance with one embodiment of the invention, the polymer is melt processed in a compounding extruder, preferably a twin screw extruder, before the treated-fillers are fed into the extruder through a side feeder. The melt-processing can be conducted with or without ultrasound assistance. The mixture of polymer and treated fillers is then mixed, compressed, heated and converted to molten form. The conversion to molten form occurs prior to reaching the injection zone where the blowing agent or agents are added. After injecting the blowing agent, the blowing agent and the molten polymer are continuously mixed under pressures to ensure a homogenous solution of the resin and the blowing agent. The molten mixture is then conveyed into a cooling zone where the melt is cooled down to a temperature suitable for blowing. In one embodiment, the mixture is then extruded through a die into a lower pressure zone, such as atmospheric pressure, to form polymer composite foam sheets and shapes of desired dimensions.

Alternatively, the treated fillers can be added during the polymerization process instead of being added during the melt-processing method as described above. Preferably, the treated fillers are added to the reactor. Similarly, the blowing agent can be added during the polymerization process instead of being added during the melt-processing method as described above. Preferably, the treated fillers are added to the reactor.

Alternatively, the treated filler can be dispersed in a solution or a solvent blending process. The polymer is dissolved in a solvent to form a solution, and the treated filler is added and mixed, so as to disperse the filler in the polymer matrix.

In accordance with one aspect of the invention, the composite foam is an expandable bead foam that has a treated filler. Expandable bead foams include, but are not limited to, expandable polystyrene, expandable polypropylene and expandable polyethylene. Generally, there are two methods used in the preparation of bead foams having a treated filler dispersed within. In accordance with one method, polymer granules are heated along with a blowing agent and a treated filler that penetrate the polymer granules and become imbedded therein. In this method, the discrete polymer granules, made either by melt blending or in-reactor blending, are impregnated with a blowing agent and a treated filler in an aqueous suspension or in an anhydrous state in a pressure vessel at an elevated temperature and pressure. In the case of the aqueous suspension, the blowing agent and the treated filler are introduced into the liquid medium in which the granules are substantially insoluble (such as water) at an elevated pressure and temperature in an autoclave or other pressure vessel. The granules are then either discharged rapidly into an atmosphere or a region of reduced pressure to expand the granules into foam beads or cooled and discharged as expandable beads. In accordance with a second method, a monomer is polymerized in the presence of a blowing agent and a treated filler so that the blowing agent and the treated filler become entrapped in the plastic beads. Typical blowing agents include hydrocarbons such as, for example, isomeric pentanes and hexanes, halocarbons and mixtures of both.

The expandable beads having a treated filler dispersed within are then converted or expanded to foam. Typically, the expansion process involves heating the beads by steam, hot water or hot air to pre-expand the beads; aging (or conditioning) the pre-expanded beads for a period of time; and heating the pre-expanded beads again so that they undergo additional expansion. Typically the expansion occurs in conjunction with molding techniques to form composite foam products.

Further in accordance with the invention, the polymer composite foam is formed into products by conventional plastic processing techniques. For example, and not limitation, the products can be fabricated from the polymer composite foam by molding techniques such as, for example, blow molding, compression molding or injection molding, by extrusion techniques followed by thermoforming and die-cutting techniques, and by film or thin sheet converting techniques. The polymer composite foam, which can be single-layer or multilayer construction, is formed into packaging and consumer products including but not limited to trays, containers, sleeves, cups, plates, bowls, storageware, protective packaging, boards, sheets, void fillers, dinnerware, cookware, bags and the like.

In accordance with one aspect of the invention, the polymer composite foam is formed into several products as disclosed, for purpose of illustration and not limitation, in U.S. Pat. Nos. 5,094,355; 5,507,640; 5,595,769; 5,849,226; 5,860,530; 5,895,614; 5,947,321; 5,968,630; 5,993,706; 6,136,396; 6,551,435; 6,613,425; and 6,716,379, the disclosures of which are incorporated in their entirety by reference herein. In accordance with the invention, the physical properties of the products are enhanced through the use of treated fillers. It shall be understood that any product formed by a mineral filled polymer or a polymer alone can be formed with the use of a polymer composite material having treated fillers dispersed throughout the polymer.

Superior properties are accomplished at relatively lower filler loadings when compared to the loadings required for non-treated fillers due to the dispersion of the platelets and particulates in the polymer, and the creation of favorable interactions at the filler-polymer interface. The superior properties of the new composite foams are obtained at low inorganic loadings. Properties of a foam formed with such treated fillers which are enhanced include, rigidity, stiffness, impact properties, barrier properties, heat resistance, thermal stability, dimensional stability, nucleation characteristics and flame retardancy characteristics.

The use of treated fillers, such as, for example, edge-treated talc, imparts considerable enhancements to products formed from the composite foam. For example, containers fabricated from treated-filler polymer foam are more rigid, stiffer and possess better structural integrity then comparable containers made without the treated fillers. Furthermore, the improved barrier properties imparted to the polymer foam allow for its use in containers or trays which are used in extended-shelf-life applications, such as, for example perishable goods and meats. The improved barrier properties of the foam also prevent the blowing agent from escaping and thereby improve the extrusion process when rapid permeating blowing agent is used. The improved barrier property controls the migration of the blowing agent and thereby increases the integrity of the composite foam and virtually eliminates the collapse of cells. In addition, the improved barrier property reduces the need for laminate structures. Conventional polypropylene or polystyrene trays and containers which typically do not possess any barrier properties can now exhibit such barrier properties. The improved barrier properties of the composite foam having treated fillers are demonstrated through measurements of relative permeability of liquids and gases through the polymer composite foams that are formed.

Dramatic reductions in permeability are obtained at low treated filler concentrations compared to conventionally foamed polymers without such treated fillers. Without being bound by theory, the lower permeabilities are a result of much larger effective diffusion distances that occur because the large aspect ratio of the treated filler layers forces the solutes to follow more tortuous paths in the polymer matrix around the treated filler layers. Additionally, the lower concentration of treated filler effects the crystallite size and quantity, thereby effecting the barrier property. Such barriers may be selective or non-selective depending on whether or not the barrier acts to prevent a specific gas or gases from penetrating or permeating the barrier material or structure. Thus, a water vapor or moisture barrier characteristic can be imparted on the polymer using suitable treated fillers to prevent penetration or permeation by water vapor. Similarly, an oxygen barrier can be provided to prevent penetration by oxygen (for example, oxygen as contained in the atmosphere) and a flavor or aroma barrier can be provided to prevent penetration by complex organic molecules that impart flavor or aroma. These barriers can act to prevent penetration or permeation by vapors or gases by means of certain physical or chemical properties that the barrier materials or barrier structures possess.

The products of the present invention provide increased shelf storage life for contents, including beverages and food that are sensitive to the permeation of gases. Products, more preferably containers, of the present invention often display a gas transmission or permeability rate (oxygen, carbon dioxide, water vapor) of at least 10% lower (depending on treated filler concentration) than that of similar containers made from filler-free polymer, thus resulting in correspondingly longer product shelf life provided by the container.

The enhanced thermal stability of the polymer composite foam and products fabricated therefrom is also attributable to the use of treated fillers. This enhanced thermal stability, and more specifically an increase of approximately 10-80° C. of heat distortion temperature, allows for greater applications of products, specifically containers, cups and trays fabricated from the composite foam. For example, polystyrene containers having treated fillers therein of micro and nano size will exhibit improved performance at higher temperatures and can be used with heat lamps. Similarly, the use of trays in both microwave and conventional ovens will be more attainable and a broad range of polymers can be utilized for dual oven use. For example, polystyrene and polyethylene foam containers having treated fillers therein can be used in microwaves. Also, polypropylene composite foam containers can be used in multi-layer conventional oven applications. Indeed, the temperature window for the majority of the polymeric foam products of the present invention can be increased. Accordingly, certain polymers can now be used for a broader range of applications. For example, due to the enhanced physical properties such as stiffness and heat distortion, polyethylene foam composites of the present invention can be used in current polystyrene or polypropylene applications, such as, for example hot cups. Thus, more environmentally friendly polymer composites can be used for a broader range of applications.

In further accordance with the invention, and as described above, the nucleation characteristics and crystallinity and crystalline morphologies of the polymer composite foams are enhanced. The treated fillers allow for an increase in nucleation sites and overall smaller crystals. The treated fillers can serve as heterogeneous nucleation agents allowing more sites to nucleate and grow. This leads to an increase in cell density. While more cells start to grow at the same time, there is less opportunity for the individual cells to grow bigger, leading to a smaller cell size. The smaller and more dispersed spherulites allow for improved crystalline and foam growth. The enhanced nucleation creates a microcellular foam with numerous cells and increases the melt strength of the foam melt. Thus, due to the enhanced nucleation characteristics and melt strength increase, a composite of linear low density polyethylene having treated fillers therein can be used for foam applications. Accordingly, polymeric products such as, for example, containers, cups, and trays, having enhanced characteristics are fabricated from the polymer composite foam of the present invention.

In further accordance with the invention, the polymer composite foams of the present invention having treated fillers impart improved flame retardant characteristics. Accordingly, polymer foam composites with treated fillers, such as, for example, polypropylene and polystyrene composites have enhanced fire retardant characteristics and can be effectively used for broader applications.

The contents of all patents, patent applications, journals and books cited herein are hereby incorporated by reference in their entirety to more fully describe the state of the art to which the invention pertains.

It will be apparent to those skilled in the art that various modifications and variations can be made in the method and system of the present invention without departing from the spirit or scope of the invention. Thus, it is intended that the present invention includes modifications and variations that are within the scope of the appended claims and their equivalents.

The invention claimed is:

1. A polymer composite foam having a multi-layer construction, comprising:

a first layer comprising:

a first polymer capable of being formed into a polymeric foam; and an edge-modified phyllosilicate filler having a median particle size of about 0.1 nm-10 μm and a surfactant adsorbed only onto the edges thereof, the edge-modified phyllosilicate filler being exfoliated, delaminated, or intercalated;

wherein the first polymer defines a plurality of foam cells dispersed therethrough, and the edge-modified filler is dispersed throughout the first polymer; and a second layer comprising a second polymer capable of being formed into a polymeric foam and a non-treated phyllosilicate filler dispersed throughout the second polymer, wherein the edge-modified phyllosilicate filler and non-treated phyllosilicate filler comprise layers of particles stacked one on top of another.

2. The polymer composite foam of claim 1, wherein the phyllosilicates are selected from the group consisting of mica, kaolinite, smectite clays and talc.

3. The polymer composite foam of claim 1, wherein at least one of the first and second polymer is selected from the group consisting of polypropylene, polyethylene, polystyrene, styrene butadiene copolymers, polyurethanes, polyesters, polycarbonate, polyacrylonitriles, polyamides, styrenic block copolymers, ethylene vinyl alcohol copolymers, ethylene vinyl acetate copolymers, polyesters grafted with maleic anhydride, polyvinylidene chloride, aliphatic polyketone, liquid crystalline polymers, ethylene methyl acrylate copolymer, ethylene-norbornene copolymers, polymethylpentene and ethylene acyrilic acid copolymer, mixtures and copolymers thereof.

4. The polymer composite foam of claim 1, wherein the first polymer is different than the second polymer.

5. The polymer composite foam of claim 1, wherein a structural material of the first layer is different than a structural material of the second layer.

6. The polymer composite foam of claim 1, further including a non-treated filler dispersed throughout the polymer composite foam.

7. The polymer composite foam of claim 1, wherein the first layer includes at least two polymers, wherein at least one polymer contains the edge-modified filler.

8. The polymer composite foam of claim 7, wherein the at least two polymers are incompatible.

9. The polymer composite foam of claim 1, wherein the polymer composite foam has an average cell size ranging from about 1 to 500 microns.

10. The polymer composite foam of claim 1, wherein the polymer composite foam has a density of less than about 10 $lb/ft^3$.

11. The polymer composite foam of claim 1, wherein the first polymer is the same as the second polymer.

12. The polymer composite foam of claim 1, wherein the polymer composite foam has a density of less than about 20 $lb/ft^3$.

13. A product produced at least in part from a polymer composite foam, the polymer composite foam having a multilayer construction, including:

a first layer comprising:

a first polymer capable of being formed into a polymeric foam; and an edge-modified phyllosilicate filler having a median particle size of about 0.1 nm-10 μm and a surfactant adsorbed only onto the edges thereof, the edge-modified phyllosilicate filler being exfoliated, delaminated, or intercalated;

wherein the first polymer defines a plurality of foam cells dispersed therethrough, and the edge-modified filler is dispersed throughout the first polymer, and a second layer comprising a second polymer capable of being formed into a polymeric foam and a non-treated phyllosilicate filler dispersed throughout the second polymer, wherein the edge-modified phyllosilicate filler and non-treated phyllosilicate filler comprise layers of particles stacked one on top of another.

14. The product of claim 13, selected from the group consisting of trays, containers, sleeves, cups, plates, bowls, protective packaging, boards, sheets, void fillers, bags, storageware, dinnerware and cookware.

15. The product of claim 13, wherein the phyllosilicates are selected from the group consisting of mica, kaolinite, smectite clays and talc.

16. The product of claim 13, wherein at least one of the first and second polymer is selected from the group consisting of polypropylene, polyethylene, polystyrene, styrene butadiene copolymers, polyurethanes, polyesters, polycarbonate, polyacrylonitriles, polyamides, styrenic block copolymers, ethylene vinyl alcohol copolymers, ethylene vinyl acetate copolymers, polyesters grafted with maleic anhydride, polyvinylidene chloride, aliphatic polyketone, liquid crystalline polymers, ethylene methyl acrylate copolymer, ethylene-norbornene copolymers, polymethylpentene and ethylene acrylic acid copolymer, mixtures and copolymers thereof.

17. The product of claim 13, wherein the first polymer is different than the second polymer.

18. The product of claim 13, wherein a structural material of the first layer is different than a structural material of the second layer.

19. The product of claim 13, wherein the polymer composite foam further includes a non-treated filler dispersed throughout the polymer.

20. The product of claim 13, wherein the first layer includes at least two polymers, wherein at least one polymer contains the edge-modified phyllosilicate filler.

21. The product of claim 20, wherein the at least two polymers are incompatible.

22. The product of claim 13, wherein the polymer composite foam has an average cell size ranging from about 1 to 500 microns.

23. The product of claim 13, wherein the polymer composite foam has a density of less than about 10 $lb/ft^3$.

24. The product of claim 13, wherein the first polymer is the same as the second polymer.

25. The product of claim 13, wherein the polymer composite foam has a density of less than about 20 $lb/ft^3$.

* * * * *